Patented Aug. 4, 1936

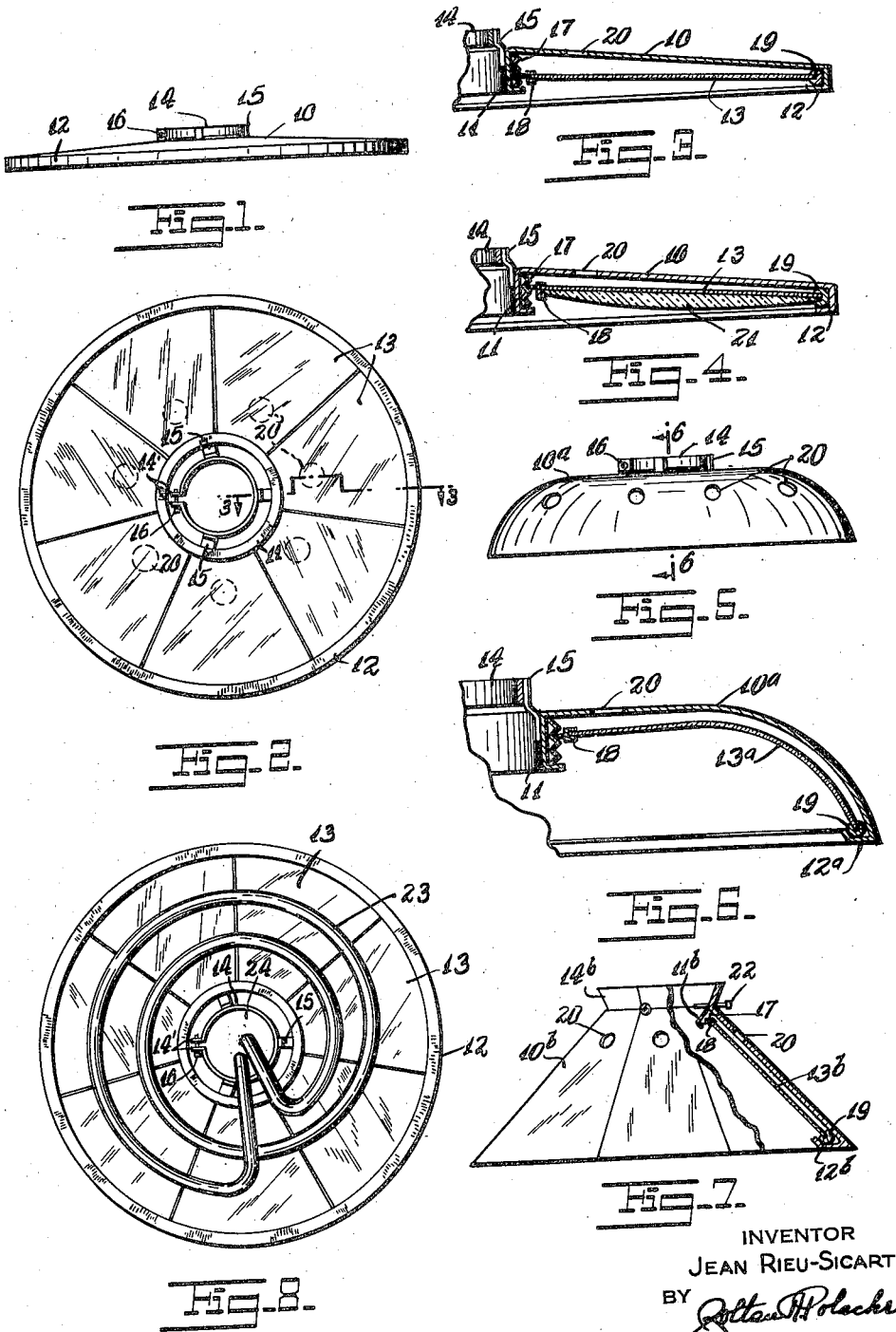

2,049,930

UNITED STATES PATENT OFFICE 2,049,930

ELECTRIC LIGHT REFLECTOR

Jean Rieu-Sicart, New York, N. Y.

Application February 1, 1935, Serial No. 4,525

2 Claims. (Cl. 240—103)

This invention relates to new and useful improvements in an electric light reflector.

More particularly, the invention contemplates the provision of an annular shell having internal and external flanges and a plurality of mirror sections in substantially edge contact with each other and supported by the said flanges.

The invention further proposes the provision of seven mirror sections as mentioned in the previous paragraph, as the most efficient number for use with commercial sized electric bulbs.

Furthermore the invention proposes the provision of a means associated with the shell by which the socket of an electric lamp may be connected therewith so that the lamp may be supported in proper relation to the mirror sections.

Another of the objects of this invention is the provision of means whereby each of the mirror sections may be adjusted for varying the reflecting angle of the rays from the lamp.

Still further the invention contemplates the teaching of the application of the invention to various embodiments of devices.

Another one of the objects of this invention is the construction of a device as mentioned which is simple and durable and which can be manufactured and sold at a reasonable cost.

For further comprehension of the invention, and of the objects and advantages thereof, reference will be had to the following description and accompanying drawing, and to the appended claims in which the various novel features are more particularly set forth.

In the accompanying drawing forming a material part of this disclosure:

Fig. 1 is a side elevational view of an electric light reflector constructed according to this invention.

Fig. 2 is a bottom view of Fig. 1.

Fig. 3 is a fragmentary sectional view taken on the line 3—3 of Fig. 2.

Fig. 4 is a view similar to Fig. 3 but illustrating another embodiment of the invention.

Fig. 5 is a side elevational view of another electric light reflector constructed according to a still further modification.

Fig. 6 is a fragmentary sectional view taken on the line 6—6 of Fig. 5.

Fig. 7 is another side elevational view of an electric light reflector constructed according to a still further embodiment of the invention, a portion thereof being broken away to disclose interior parts.

Fig. 8 is a view of the reflector shown in Fig. 2 to which a neon tube has been added.

The electric lamp reflector, according to this invention, comprises a shell 10 of annular shape having an internal flange 11 and an external flange 12. A plurality of mirror sections 13 are arranged in substantially edge contact with each other and are supported between the flanges 11 and 12. A means is provided for attaching a lamp socket on said shell so that the lamp is at the center and its rays strike off from the mirror sections. This latter means comprises an annular shaded clamp 14 attached at the center of the shell 10 with several braces 15 which are welded or brazed into position. The clamp 14 is formed with adjacent free ends 14' adapted to be clamped together by a screw 16 engaging these parts.

The flange 11 is of substantial depth so that the inner ends of the mirror sections may be adjusted. More particularly, vertically disposed corrugated strips 17 are mounted within the internal flange 11 and arranged adjacent the inner ends of the mirrors. Catch elements 18 are mounted upon the inner ends of the mirrors and adapted to engage the corrugations of the strips 17 so as to hold the mirrors in fixed positions. The outer ends of each of the mirror sections are covered with resilient tubular binding pieces 19 disposed within the external flange 12 in such a manner that they act as pivots to allow the mirror sections to pivot. A plurality of openings 20 are formed in the shell 10, one over each of the mirror sections through which the mirror sections may be manually forced downwards to adjusted positions. The mirror sections may be manually forced upwards from the open bottom side of the shell.

In Fig. 4 a modified form of the invention has been disclosed wherein each of the mirror sections 13 is provided with a magnifying glass 21 arranged so as to direct the reflected rays in desired directions.

In Figs. 5 and 6 another embodiment of the invention has been disclosed which is substantially identical to the previous form except for the design of the individual parts. More particularly, this form of the invention discloses an annular casing 10ᵃ which has its outer area curved downwards. This casing is provided with an internal flange 11 and an external flange 12ᵃ. The plurality of mirror sections 13ᵃ are arranged in substantially edge contact with each other similar to the arrangement shown in Fig. 2, but distinguish from the prior form in that these mirror sections are of convex shape corresponding with the shape of the annular shell. In other respects this form of the invention is identical to the previous form and the corresponding parts may be recognized by the identical reference numerals.

In Fig. 7 another modified form of the invention is shown in which the device includes a shell 10b of annular shape but substantially frusto-conical in form. The shell is formed with a top flange 14b. A plurality of set screws 22 engage through the base of the flange 14b and are adapted to clamp and hold the lamp socket in proper position within the shell. A plurality of mirror sections 13b are arranged in substantially edge contact with each other, similar to the arrangement shown in Fig. 2, but extend along the sloping sides of the shell.

The shell is formed with an internal flange 11b and an external flange 12b. The external flange 12b supports binding material 19 mounted upon the outer edge of the mirror sections. The inner edge of the mirror sections are similar to the arrangement previously described. The corresponding parts of this form of the invention are identical to the parts of the previous forms and the corresponding parts may be recognized by the identical reference numerals.

In Fig. 8, the form of the device illustrated in Figs. 1–3 is shown in operation with a neon tube 23. This neon tube is mounted on a socket 24 supported by the clamp 14. The application of conventional bulb shaped lamps with the device will be readily understood and for this reason detailed drawings will not be given in this specification.

The operation of the device is as follows:

The rays of light from lamps, which customarily illuminate the upper areas of rooms or spaces, in an inefficient manner, are reflected downwards to brightly illuminate areas desired to be illuminated. In this manner, not only will the desired areas receive the ordinary direct rays, but will be supplemented with the reflected rays.

While I have illustrated and described the preferred embodiment of my invention it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. In an electric light reflector, a shell having an external flange and an internal flange, a plurality of mirror sections in edge contact with each other, resilient tubular binding pieces on one of the ends of said mirror sections and rotatively mounted on one of said flanges, corrugated strips mounted on the other of said flanges, and catches on the ends of the mirror sections opposite said binding pieces and engaging said corrugated strips for holding the mirror sections in fixed positions.

2. In an electric light reflector, a shell having an external flange bent inwards and an internal flange bent outwards, a plurality of mirror sections in edge contact with each other, resilient tubular binding pieces on one of the ends of the said mirror sections rotatively engaged between one of said flanges and the shell, corrugated strips mounted between the other of said flanges and the shell, and catches on the ends of the mirror sections opposite said binding pieces and engaging said corrugated strips for holding the mirror sections in fixed positions.

JEAN RIEU-SICART.